United States Patent [19]

Li

[11] Patent Number: 5,727,681

[45] Date of Patent: Mar. 17, 1998

[54] COMPACT DISK ARRANGEMENT CASE STRUCTURE

[76] Inventor: Ching-Hsiang Li, No. 45, Lane 431, Hua-Cheng Rd., Hsin-Chuang Shih, Taipei Hsien, Taiwan

[21] Appl. No.: 805,201

[22] Filed: Feb. 27, 1997

[51] Int. Cl.⁶ .................................................. B65D 85/57
[52] U.S. Cl. ........................................ 206/308.1; 206/313
[58] Field of Search ........................... 206/307.1, 307, 206/308.1, 309, 310, 311, 312, 313

[56] References Cited

U.S. PATENT DOCUMENTS 5,176,250  1/1993  Cheng ............................ 206/308.1 X
5,477,960  12/1995  Chen ............................... 206/309 X Primary Examiner—Jacob K. Ackun
Attorney, Agent, or Firm—Bacon & Thomas

[57] ABSTRACT

A plurality of compact disks may be stored and individually removed from a case having upper and lower case halves, an elastically deformable holding element, a plurality of disk trays and a resilient latch element for securing the case halves together.

6 Claims, 7 Drawing Sheets

FIG. 1A PRIOR ART
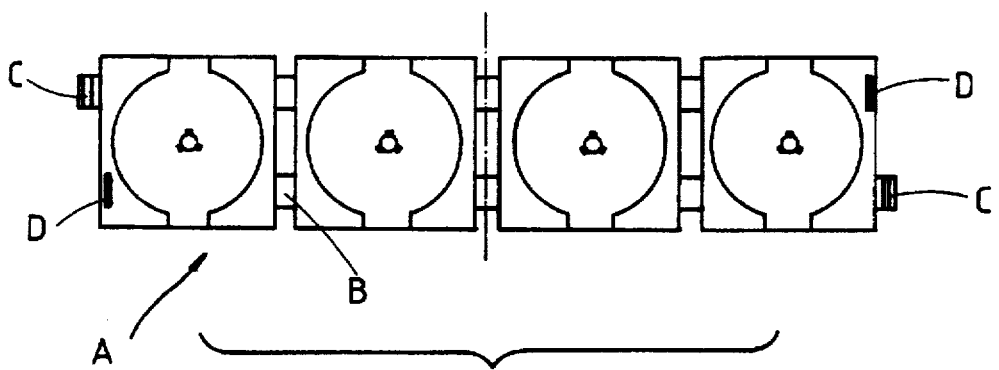
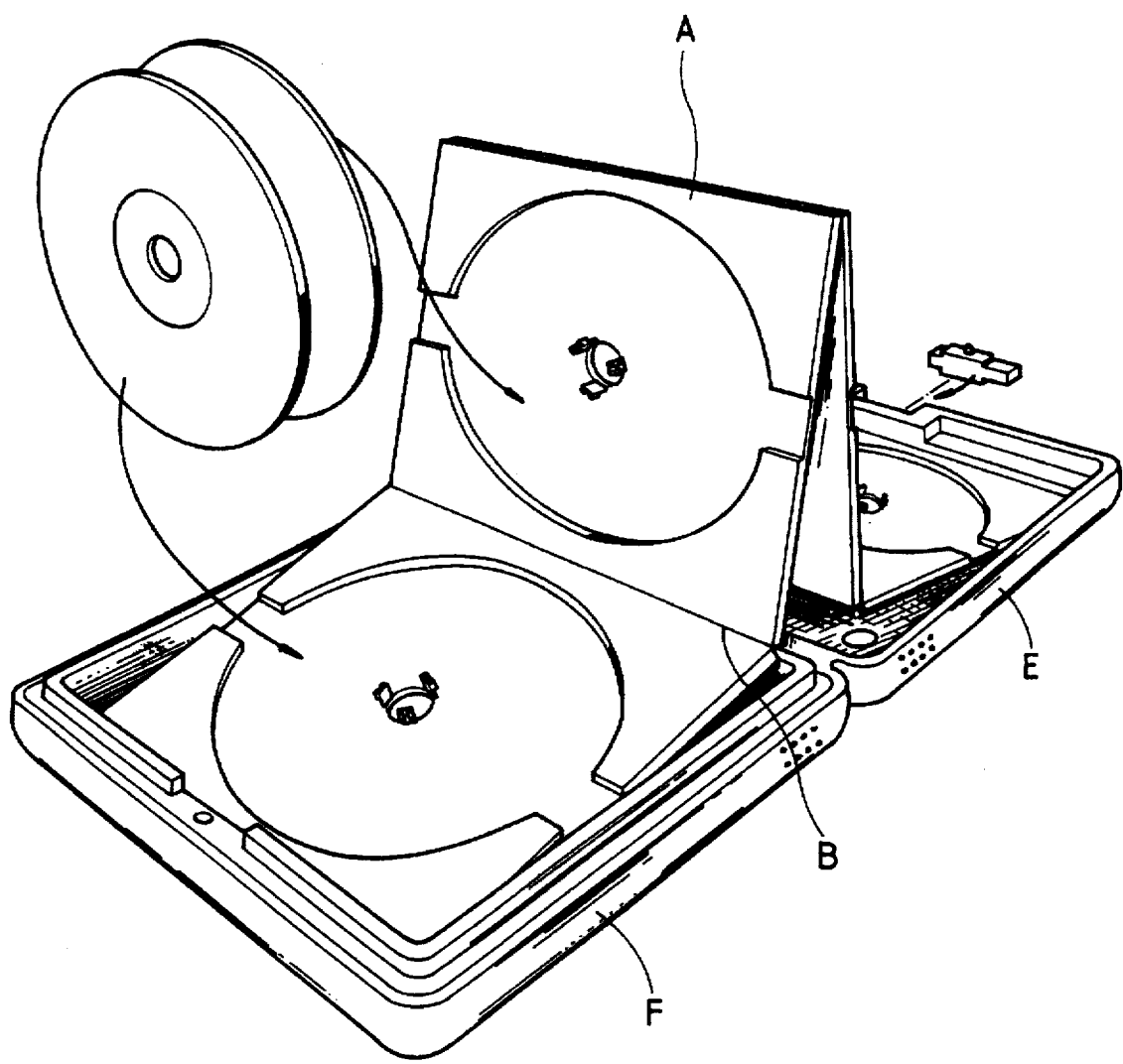
FIG. 1 PRIOR ART

COMPACT DISK ARRANGEMENT CASE STRUCTURE

SUMMARY OF THE INVENTION

The present invention relates to a compact disk arrangement case structure, especially to an arrangement case structure that can give its contents sufficient protection, and further has the features of exposing these disks, one after another, to view when the case opens and piling up these disks to close the case.

Along with the advance of industrial technologies the production and storage of musical melodies have extensively adopted compact disks as a chief storage apparatus. This is due to the merit of high fidelities of sounds and affordable prices. A compact disk can store massive data in a small space. As an illustrative example, a compact disk of 12 centimeter standard size can store information as much as contents of an encyclopedia consisting of several volumes.

A compact disk is lightweight and vulnerable. Thus it is an important consideration to users of how to preserve them. There are many kinds of arrangement cases on the market. For instance, in U.S. Pat. No. 5,246,107 a compact disk arrangement box (shown in FIG. 1) is disclosed which employs a mechanism that spreads disks as the case opens in order that users can see them. The mechanism includes a molded part A consisting of a plurality of disk trays serially connected by a foldable portion B and attached to the upper and the lower case halves E and F by a foldabe tab C and a slot D provided on each end of the part A. With such a mechanism, the compact disk arrangement box can achieve the effects of protecting its contents and exposing them to view.

The above-mentioned arrangement box adopts an internal substructure in which one disk tray is placed over another disk tray upside down and oppositely. Such a stack takes a larger space. Accordingly the box has a larger thickness. Further, existing arrangement box structures provide protection only for compact disks. They can not provide the same care for floppy disks. An arrangement case has never been seen before that has the advantages of low manufacturing costs and compact design, and can provide sufficient protection for both compact disks and floppy disks.

In view of the above problems, the primary object of the invention is to provide a compact disk arrangement case structure that has a simplified construction and reduced manufacturing costs, can provide safe storage room for compact disks as well as floppy disks, and allows disk trays being stacked in a pile to provide convenience in storage.

Another object of the invention is to provide a compact disk arrangement case structure that minimizes the thickness and volume of stacked compact disks, is easy to manually manipulate, and can provide users a quick review of the contents during a retrieval.

The other object of the invention is to provide a compact disk arrangement case structure that allows its disk tray to be installed and disassembled in company with a disk on it. This feature can reduce the possibility of touching fingers with the compact disk and thus increases the service life of a disk.

To accomplish the above objects, a compact disk arrangement case according to the invention comprises an upper case half, a lower case half, a holding element, disk trays, and a resilient latch element.

The holding element is an elastically deformable block made of plastic materials and provided with a plurality of insertion slots that are configured to have a reduced neck portion at their entrances and two projecting fulcrum rod portions on two ends thereof. In assembling, the holding element is put into place with projecting fulcrum rod portions extending into the grooves of the upper and lower case halves and hooked there. When opening the case, the holding element will elastically deform. Not only can each insertion slot secure a disk tray but also it is sized to fit for snugly holding a 3.5" floppy disk. A resilient latch element associated with a lock hole is used for keeping the case halves closed. The disk trays in a closed case are piled up for the minimization of storage space.

BRIEF DESCRIPTION OF ACCOMPANYING DRAWINGS

The major features and novelty of the invention will become apparent from the following detailed description of preferred embodiments when read in conjunction with the accompanying drawings, in which:

FIG. 1 is a perspective view showing the appearance of a conventional compact disk arrangement case in an open position;

FIG. 1A shows a plurality of molded disk trays in an unfolded condition;

DETAILED DESCRIPTION OF PREFERRED EMBODIMENTS

Figure 2:
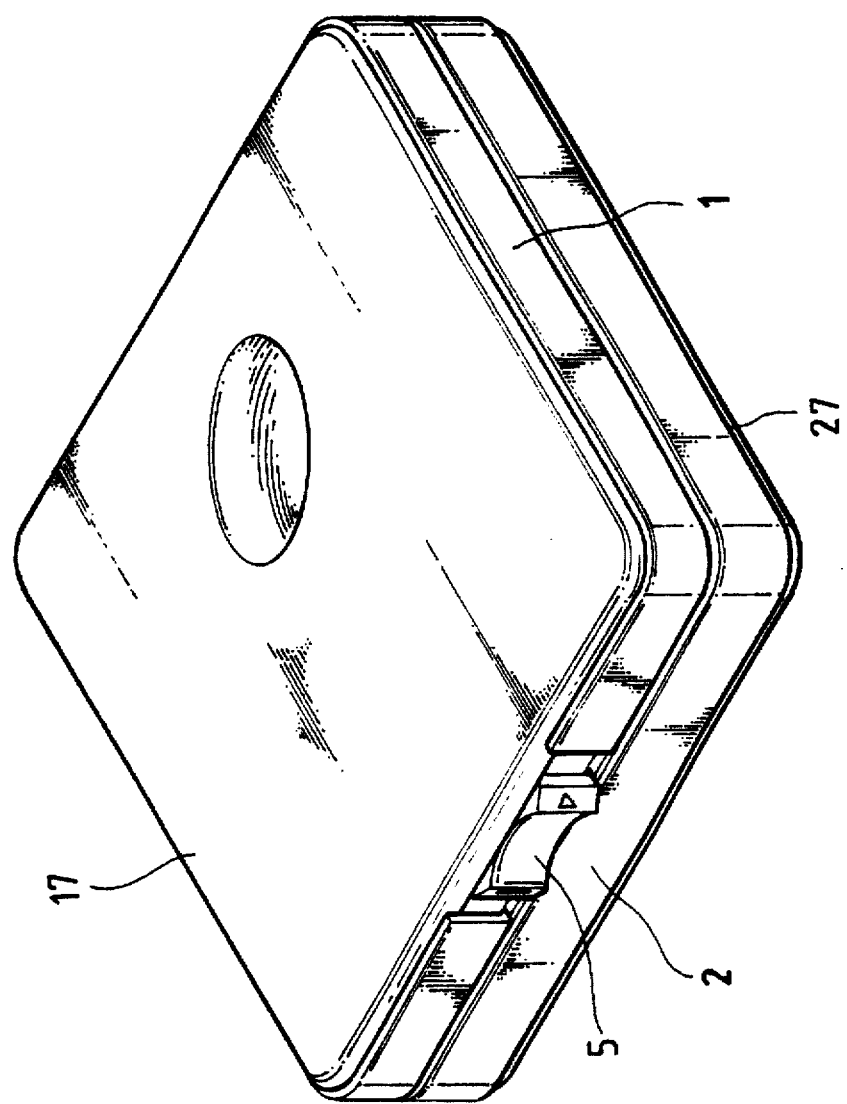
FIG. 2 shows the exterior configuration of a compact disk arrangement case according to the invention.
Figure 3:
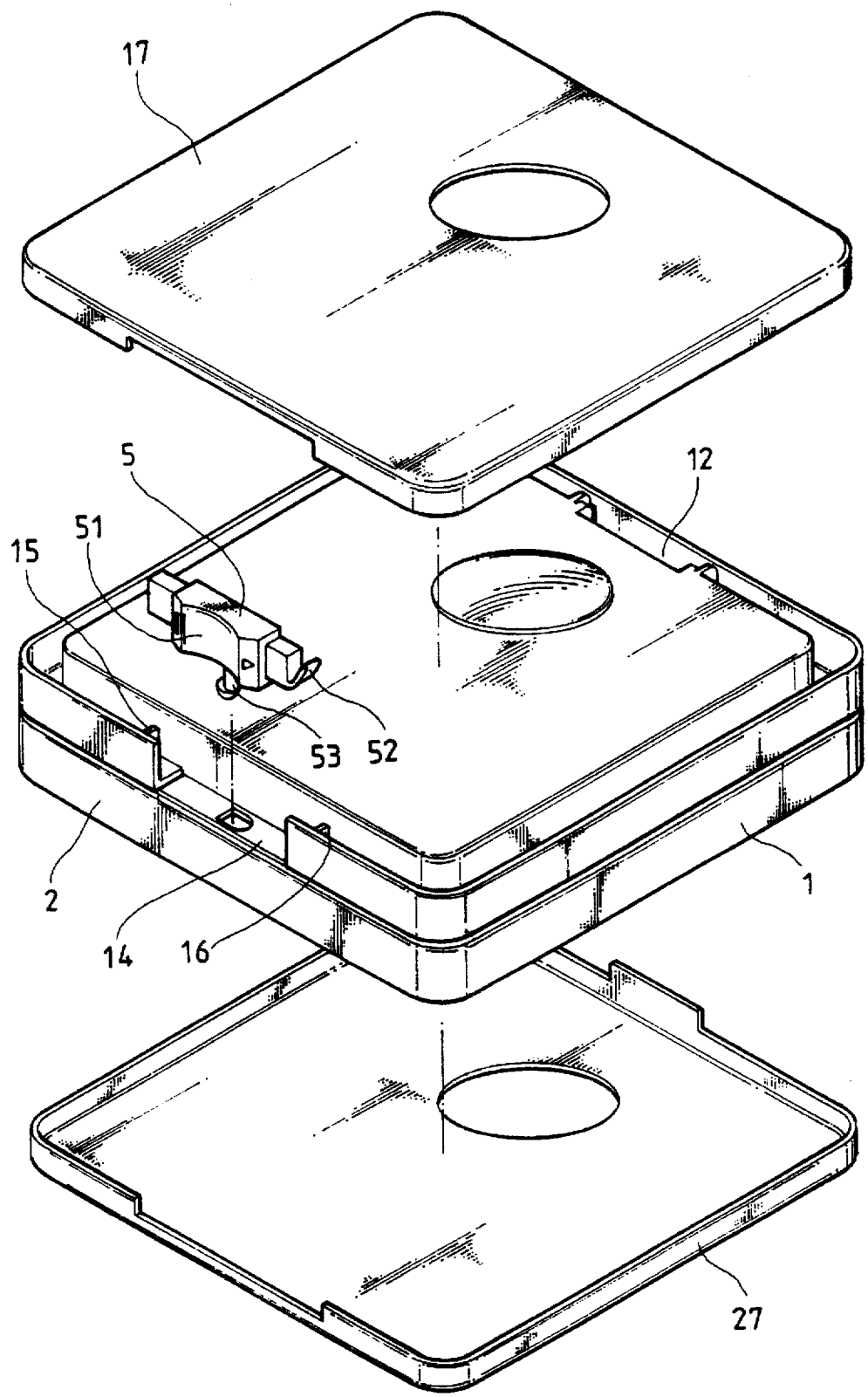
FIG. 3 is an exploded view illustrating the outer parts of the case shown in FIG. 2.
Figure 4:
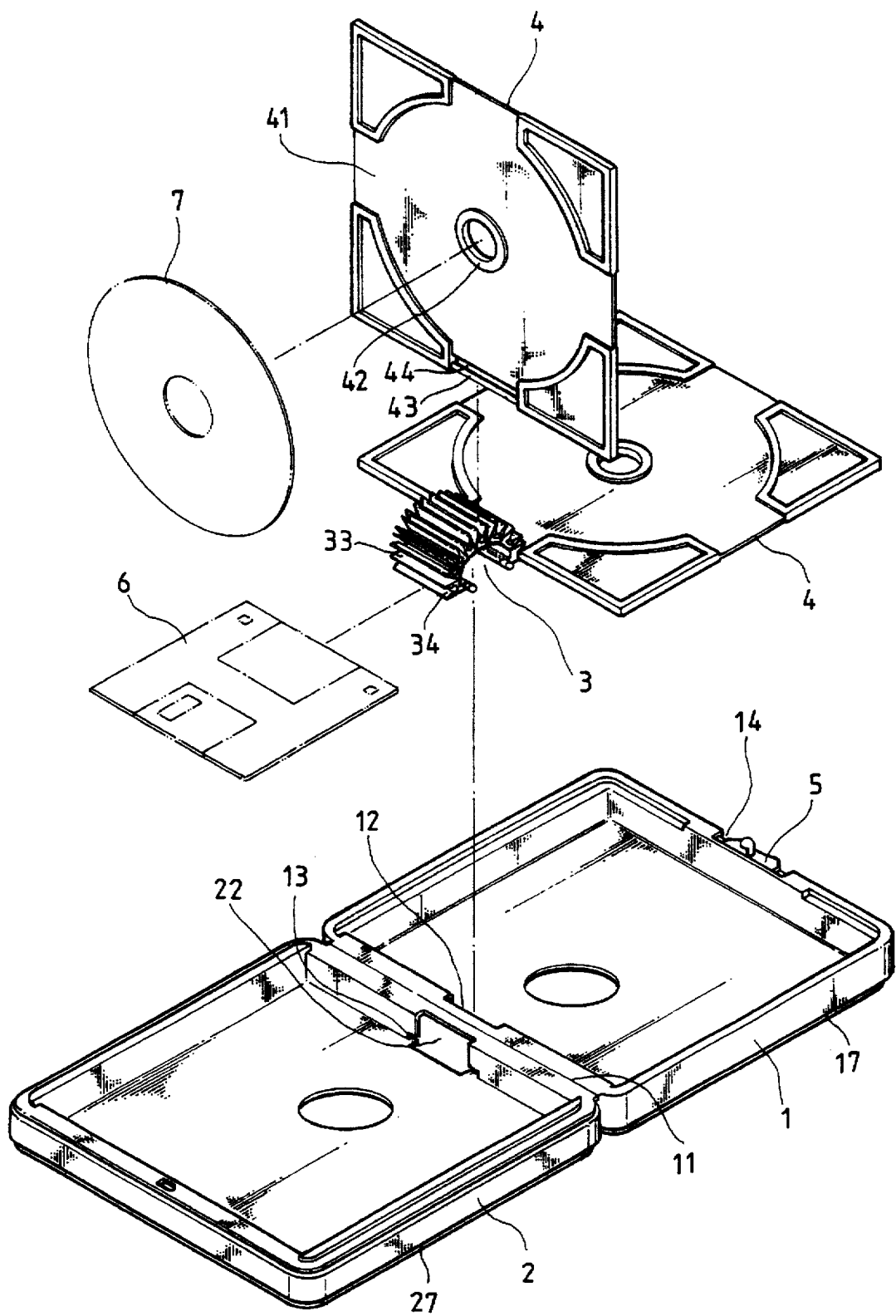
FIG. 4 is an exploded view depicting the inner parts of the case shown in FIG. 2.

Referring to FIGS. 2 through 4, the invention generally includes an upper case half 1, a lower cover half 2, a holding element 3, a plurality of disk trays 4, and a resilient latch element 5.

The upper and the lower cases half 1 and 2 both have a square exterior shape and their interiors constitute an interanl compartment. These two case halves are linked with each other by a thin flexible connecting portion 11 that is integally molded between the case ha)yes. Formed on the walls of the case halves 1 and 2 near the connecting portion 11 are respectively square grooves 12 and 22, either of which can be provided with cuts 13 that are slightly flexible for allowing the insertion of two fulcrum rod portions 31 and 32 of the holding element 3. The upper case half 1 contains an opening 14 on the exterior walls, with two stop walls 15 and 16 individually disposed at the two ends of the opening 14, for receiving an elastic latch element 5. A top cover 17 and a bottom cover 27 are respectively placed on the top surface of the upper case half 1 and the bottom surface of the lower case half 2.

Figure 5:
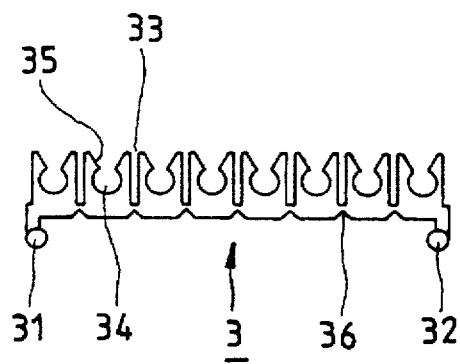
FIG. 5 is a side view of a holding element of the invention.
Figure 6:
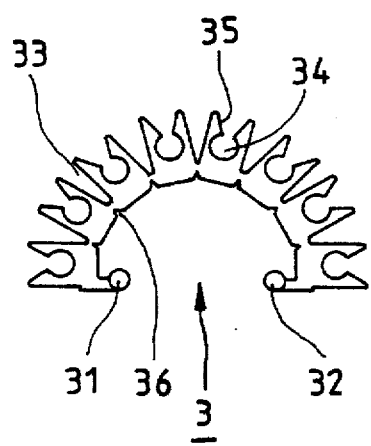
FIG. 6 is a schematic view showing the deformation of the holding element of FIG. 5.
Figure 9:
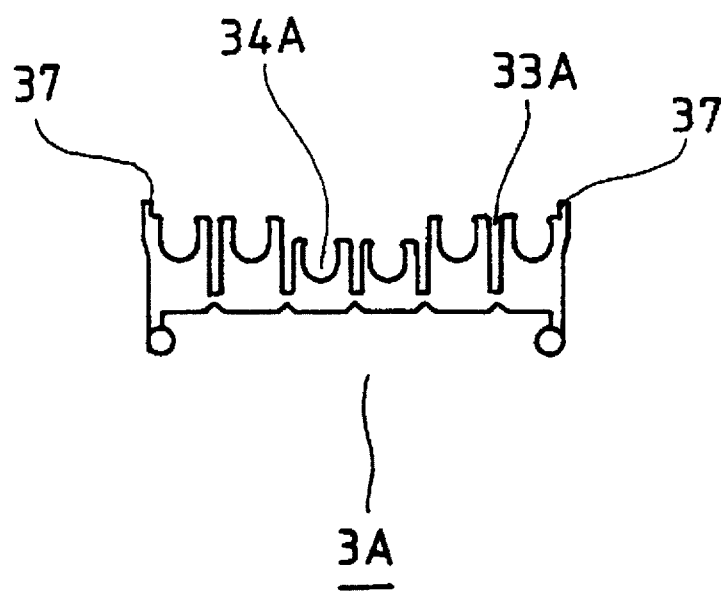
FIG. 9 is a side view showing another preferred embodiment of a holding element according to the invention.

Referring to FIGS. 5 and 6, the holding element 3, consisting of a long deformable body with projecting fulcrum rod portions 31 and 32 arranged on two opposite ends thereof, is made into a single piece by injection molding. The holding element 3 has a plurality of insertion slots 34 each associated with a vertical gap 33 formed between two adjacent slots 34. The slots 34 has a reduced neck portion 35 at its entrance. On the bottom surface of the holding element 3 corresponding to each vertical gap 33 is formed a recessed notch 36 that makes it easier to curl the holding element 3. In another preferred embodiment of the invention shown in FIG. 9, these insertion slots 34A ace designed to be of different height and so are the vertical gaps 33A. Besides, the holding element 3A has extending portions 37 formed on two ends, which extending portions 37 rest against the walls of case halves to help turning disk trays when a curled holding element is seated inside the compact disk arrangement case.

The disk tray 4 is provided on each side face with a recessed portion 41 and a central annular projecting locating portion 42 to accommodate a compact disk and contains at least one guide slot 44 accompanied by an elongated raised block 43 along one side edge. The raised block 43 is dimensioned to fit the insertion slots 34 so that it can be put into slots 34 and rotatably held in position by the reduced neck portion 35 of the slot 34 and can be disengaged from the holding element 3 when applying a small force to pull the disk tray 4.

The resilient latch element 5 shown in FIG. 3 is a block with a concave surface 51 formed on its central portion, and an extending column on two ends, one of which is connected to a flexible finger 52, and a hook rod 53 disposed on the bottom face.

When the holding element 3 is placed in position with the fulcrum rod portions 31 and 32 respectively extending into the grooves 12 of the upper case half and the groove 22 of the lower case half, it serves as an elastically deformable spreading device by which the trays inserted into slots 34 can display the compact disks thereon in an equally angular spaced way as the case is open as shown in FIG. 6.

In addition, the upper and the lower case halves 1 and 2 are provided with a lock mechanism designed to secure the case halves in place when they are closed and that consists of a resilient latch element 5 fixed in the opening 14 of the upper case half 1 and a lock hole 23 formed on the lower case half 2 in a position corresponding to the hook rod 53 of the latch element 5.

Figure 7:
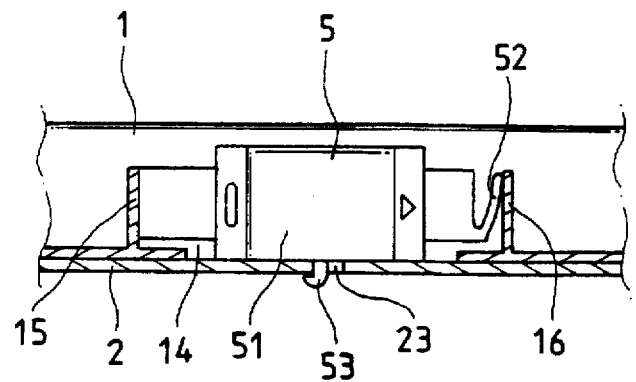
FIG. 7 is a schematic view showing a resilient latch element of the invention in a locked state.
Figure 8:
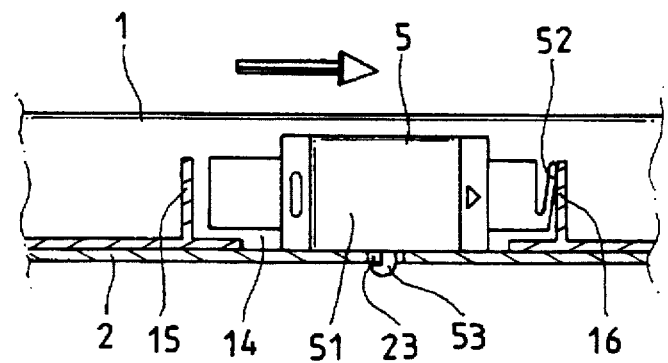
FIG. 8 illustrates the latch element of FIG. 7 in an unlocked state.

Attention is directed to FIGS. 2, 7, and 8 where the principle of the lock mechanism is illustrated. A simplified structure of the lock mechanism contains stop walls 15 and 16 separately disposed on two ends of the opening 14. The resilient latch element 5 horizontally slides in the opening 14, with the flexible finger 52 orientated toward its unlock position and the hook rod 53 extending into the lock hole 23 of the lower case half 2 when the case is closed. To open the case, move the upper case half 1 from the closed position while push the resilient latch element 5 by a finger toward the finger end of the latch element 5. In this way, the hook rod 53 can easily retract from the locked positon to allow the opening of the case.

While the present invention has been described with reference to a few specific embodiments, the description is illustrative and should not be construed as limits of the invention. Various modifications can be made by those skilled in this art without departing from the scope of the invention. For instance, the holding element 3 according to the invention is not limited to only one piece. Obviously it can also obtain the same effect if two or three holding elements are equidistantly distributed along the connecting portion 11 between the upper and lower case halves, in conjunction with a corresponding arrangement of the guide slot 44 and the raised block 43 of disk trays 4. All such equivalent structures are to be included within the spirit and scope of the invention. Furthermore, the insertion slots 34 of the holding element 3 can be also designed to accommodate floopy disks 6, not exclusively for compact disks 7. This is one of the features of the invention. The arrangement case according to the invention is more compact in comparison with traditional cases.

In summary, the invention includes a case with holding elements, the case employing curled holding elements to hold a plurality of disk trays and display compact or floopy disks on these trays in a neat, orderly, and easy-to-view way when users open the case. This case of the invention, thus, provides convenience and perfect protection to its contents.

What is claimed is:

1. A compact disk arrangement case structure mainly comprising:

an upper case half having an internally concave portion, a side edge extending to form a thin flexible connecting portion by which said upper case half is integrally linked with a lower case half, a square groove formed on the case walls near said connecting portion, an opening provided on the exterior walls thereof as well as two stop walls individually disposed on two ends of said opening, and a top cover placed on the external surface thereof;

a lower case half having an internally concave portion, a side edge connected with said flexible connecting portion, a square groove formed on the case walls near said connecting portion, a lock hole formed at a position corresponding to said opening of said upper case half, and a bottom cover placed on the external surface thereof;

a holding element made of plastic materials and being a single piece of elastically deformable elongated block provided with two projecting fulcrum rod portions on two ends thereof, said holding element having a plurality of insertion slots each accompanied with a vertical gap formed between two adjacent insertion slots and a recessed notch provided on the bottom face of said holding element in a position corresponding to said vertical gaps; said insertion slots being configured to have a reduced neck portion at its entrance;

a plurality of disk trays each provided on each side face with a recessed portion and a central annular projecting locating portion and having at least one guide slot accompanied with an elongated raised block along one side edge thereof;

a resilient latch element being a block with a concave surface formed on its central portion, an extending column at two ends one of which is connected to a flexible finger, and a hook rod disposed on the bottom face thereof;

said holding element capable of grasping a disk tray in each of said insertion slots by means of engaging said raised block with said reduced neck portion of the insertion slot and being curled and striding on the case walls on two sides of said connecting portion with said fulcrum rod portions respectively extending into the grooves of the upper and the lower case halves so that as the case opens said insertion slots spread to display said disk trays in an equally angular spaced manner in a semi-circular zone.

2. A compact disk arrangement case structure as claimed in claim 1, wherein each insertion slot of said holding element is configured to have a reduced neck portion at its entrance, which is sized to firmly grasp a disk tray.

3. A compact disk arrangement case structure as claimed in claim 1, wherein each of said vertical gaps of said holding element is accompanied by a recessed notch provided on the bottom face of the holding element in a position right under the vertical gap.

4. A compact disk arrangement case structure as claimed in claim 1, wherein the heights of said insertion slots of said holding element can be different from each other.

5. A compact disk arrangement case structure as claimed in claim 1, wherein said holding element has an extending portion at two ends on the top thereof.

6. A compact disk arrangement case structure as claimed in claim 1, wherein at least one of said square grooves formed on said upper and lower case halves is provided with an extension tab that serves for detaining said latch element after the case closed.

* * * * *